W. R. FOX.
TYPE WRITING MACHINE.
APPLICATION FILED MAR. 19, 1906.
1,001,749.
Patented Aug. 29, 1911.
7 SHEETS—SHEET 2.
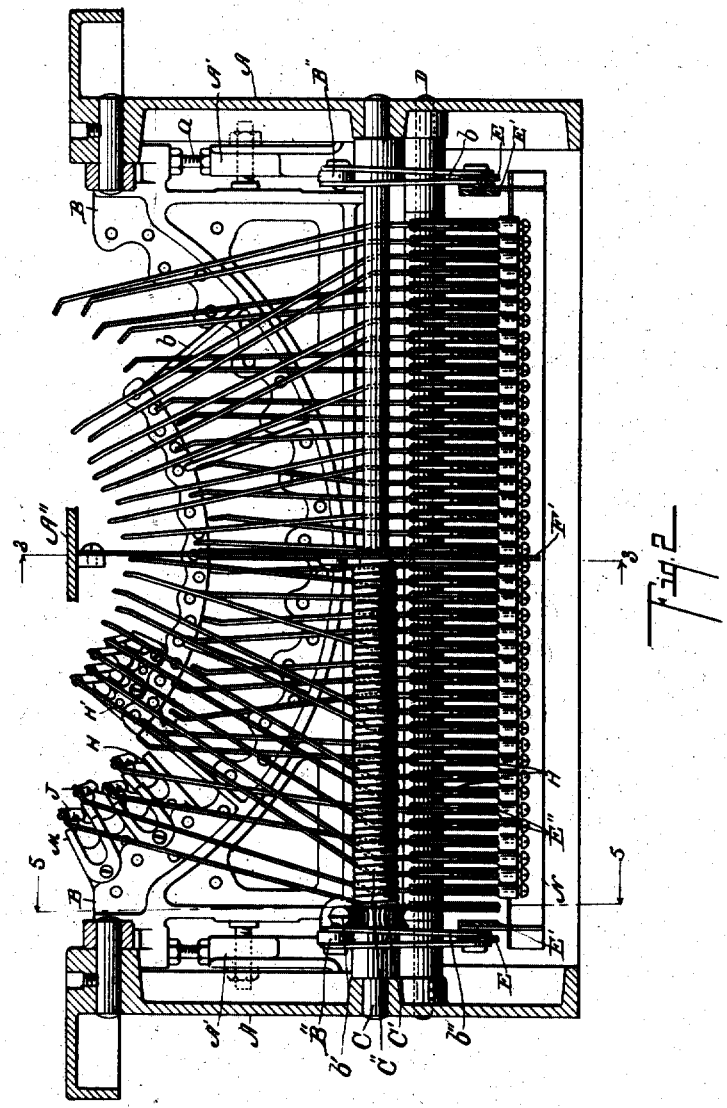
Witnesses:
Inventor,
William R. Fox
By Chappell Earl
Att'ys.

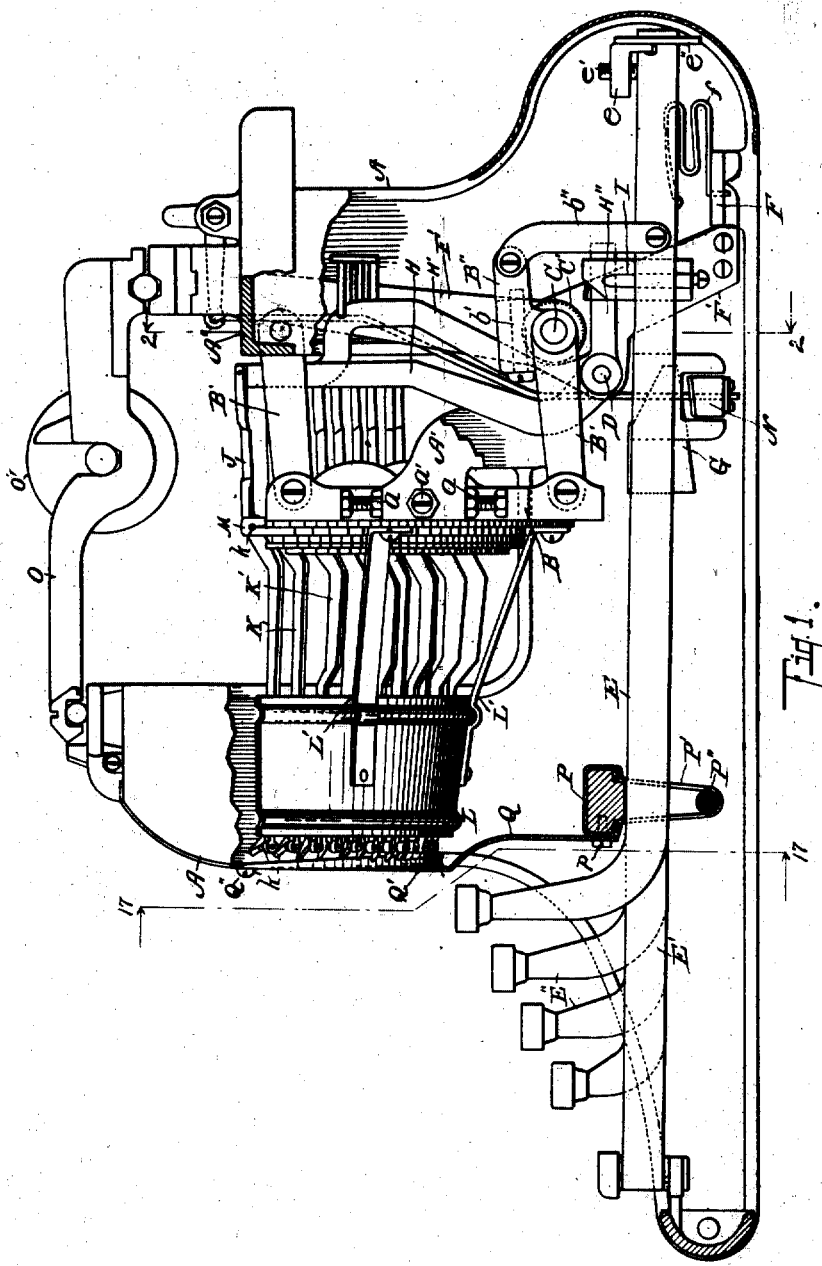

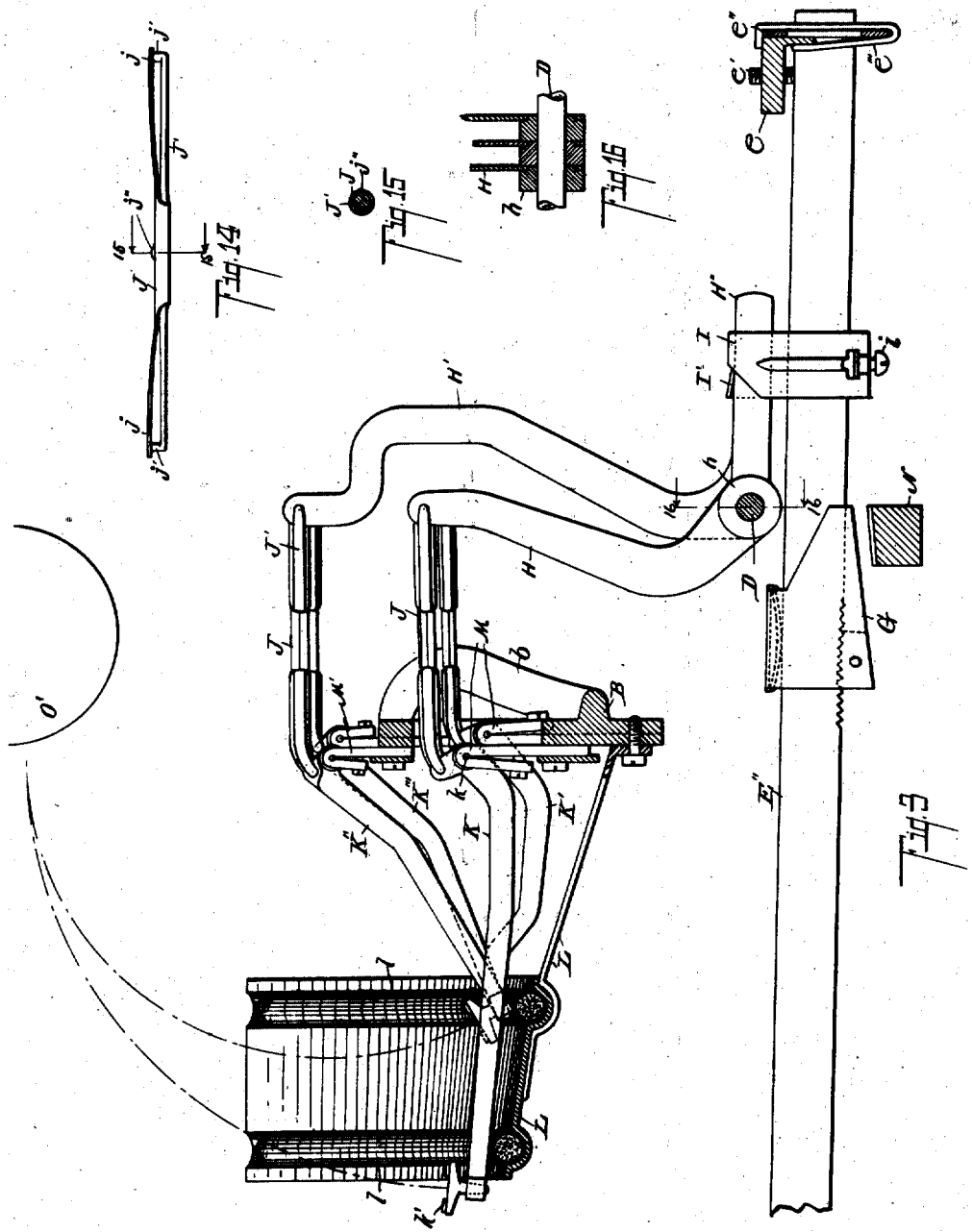

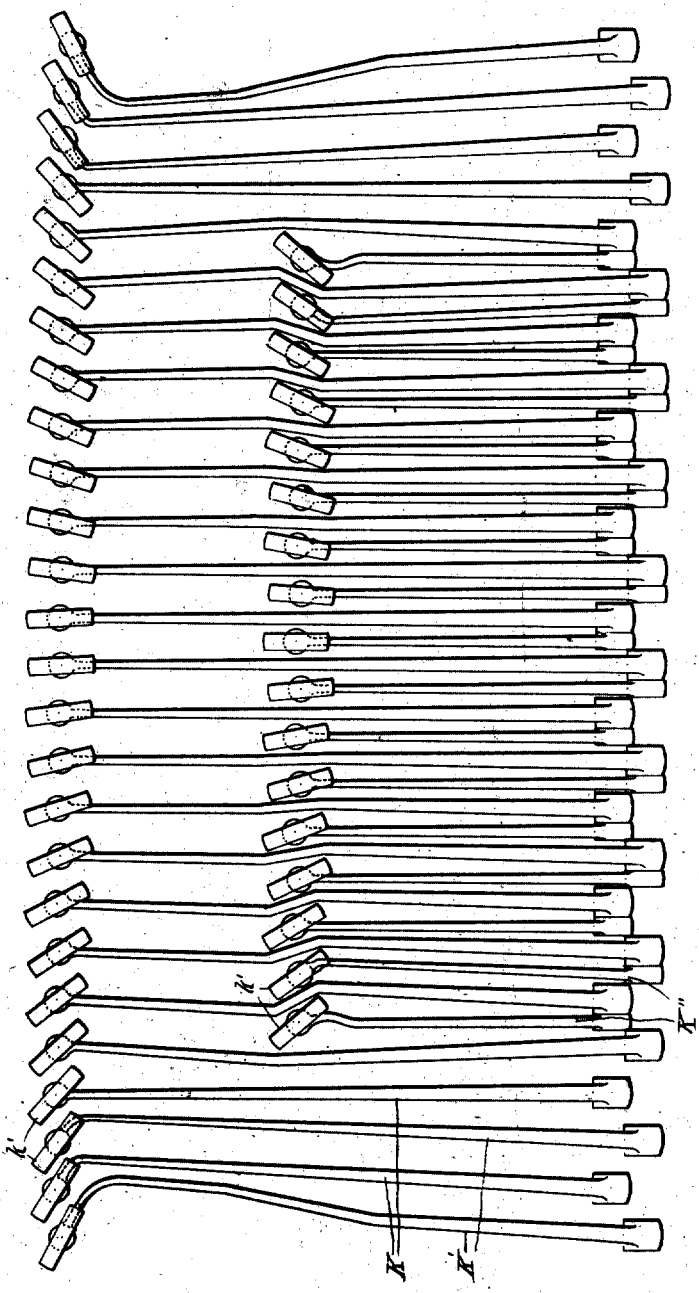

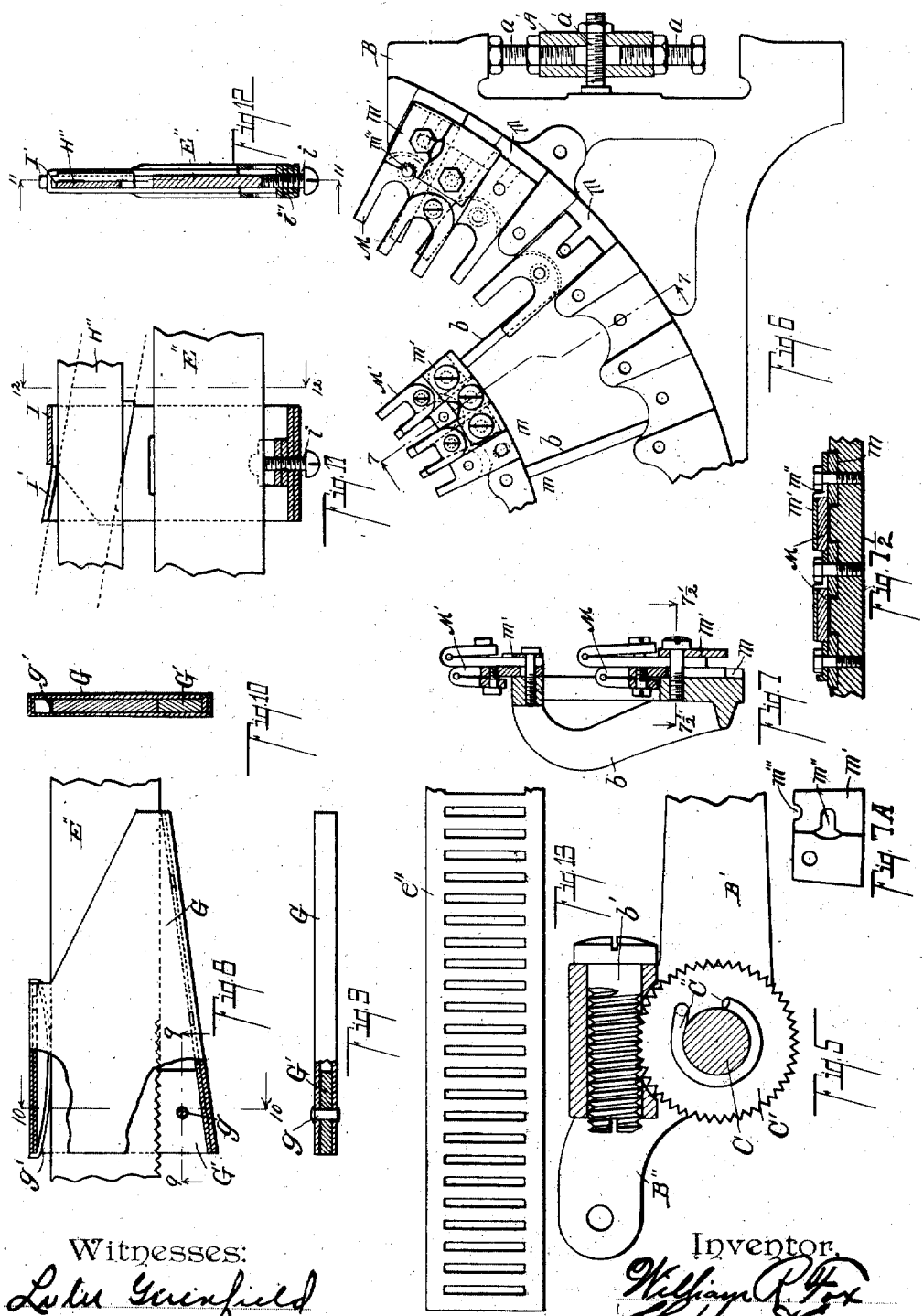

W. R. FOX.
TYPE WRITING MACHINE.
APPLICATION FILED MAR. 19, 1906.

1,001,749.

Patented Aug. 29, 1911.

7 SHEETS—SHEET 6.

Witnesses:

Inventor,
William R Fox
By
Att'ys.

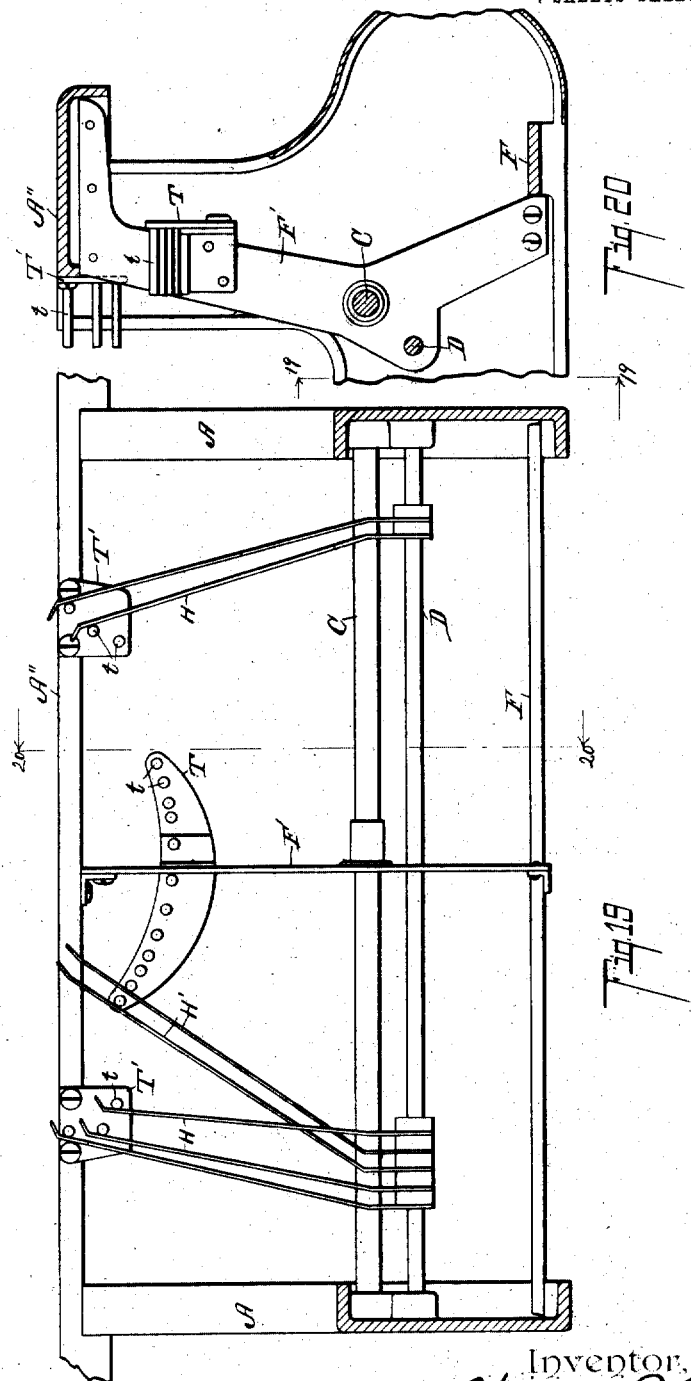

UNITED STATES PATENT OFFICE.

WILLIAM R. FOX, OF GRAND RAPIDS, MICHIGAN.

TYPE-WRITING MACHINE.

1,001,749.  Specification of Letters Patent.  Patented Aug. 29, 1911.

Application filed March 19, 1906. Serial No. 306,843.

*To all whom it may concern:*

Be it known that I, WILLIAM R. Fox, a citizen of the United States, residing at Grand Rapids, in the county of Kent, State of Michigan, have invented certain new and useful Improvements in Type-Writing Machines, of which the following is a specification.

This invention relates to improvements in typewriting machines, and particularly to improvements in typewriting machines of the type-bar variety.

The objects of the invention are: First: To provide an improved construction and arrangement of front-strike typewriting machines; second: to provide an improved construction and arrangement of segments or supports whereby a double row of type-bars is supported; third: to provide an improved construction and arrangement of type-bar segments and type-bar hangers, whereby a maximum number is supported in each row; fourth: to provide an improved shifting type-bar support in a type writer, with improved means of counterbalancing the same; fifth: to provide an improved construction and arrangement of adjustable key-lever devices and connections; sixth: to provide an improved coupling mechanism between the key-levers and type-bars; seventh: to provide an improved connection between the type-bars and their actuating levers; herein known as the top coupler; eighth: to provide an improved connection between the key-levers and the type-bar actuating levers; ninth: to provide an improved adjustment for the universal escapement bar; and tenth: to provide an improved construction of type-basket. Eleventh: to provide an improved construction and arrangement of type-bars whereby double rows of the same are utilized.

Further objects, and objects relating to structural details, will definitely appear from the detailed description to follow.

I accomplish the objects of my invention by the devices and means described in the following specification.

The invention is clearly described and pointed out in the claims.

Figure 17:
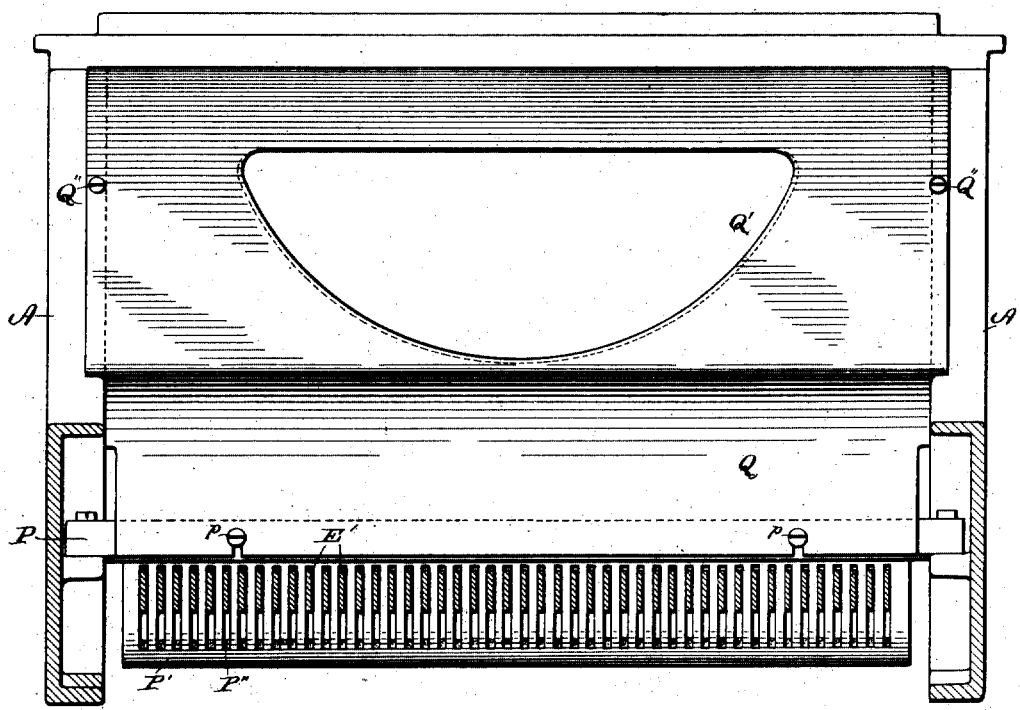
Figure 18:
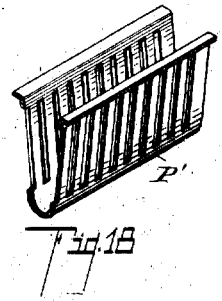

A structure embodying the features of my invention is clearly illustrated in the accompanying drawing, forming a part of this specification, in which:

Figure 1 is a side elevation view of a typewriter embodying the principles of my invention, certain portions to which my invention does not relate being omitted, and other portions being broken away to show the details of construction; Fig. 2 is a rear elevation view taken on a line corresponding to line 2—2 of Fig. 1, looking in the direction of the little arrows at the ends of the section lines; Fig. 3 is an enlarged detail view showing four of the type-bars in position, two on the inner and the other on the outer circle m m, the same being a sectional view on a line corresponding to line 3—3 of Fig. 2; Fig. 4 is a development of the type-bars and types when removed from the basket and disconnected from their hangers; Fig. 5 is an enlarged detail sectional view of the counterbalance means for type-bar support segment, the same being taken on a line corresponding to line 5—5 of Fig. 2; Fig. 6 is an enlarged detail view of a portion of the type-bar segment or shifting support, showing the arrangement of type-bar hangers thereon; Fig. 7 is a detail sectional view of the same, taken on a line corresponding to irregular line 7—7 of Fig. 6. Fig. 7$^A$ is a detail view of one of the clips; Fig. 7½ is a detail sectional view on line 7½—7½ of Fig. 7 showing detail of the connection between segment and type-bar hangers; Fig. 8 is an enlarged detail view of the adjustable stop means for the universal escapement-bar; Fig. 9 is an inverted plan of the structure appearing in Fig. 8 partially in section, on line 9—9 of Fig. 8; Fig. 10 is a sectional view taken on line 10—10 of Fig. 8; Fig. 11 is an enlarged detail view of the coupling between the key-levers and the type-bar actuating lever partially in section on line 11—11 Fig. 12. Fig. 12 is a sectional view taken on line 12—12 of Fig. 11; Fig. 13 is a rear elevation view of the comb e'', a cross-section of which appears in Fig. 3; Fig. 14 is an enlarged detail view of one of the top couplers; Fig. 15 is a detail transverse sectional view through the said coupler, taken on a line 15—15 of Fig. 14; Fig. 16 is a detail longitudinal sectional view on line 16—16 of Fig. 3, through the hubs and levers H H', the supporting-rod being shown in full lines; Fig. 17 is a detail front elevation view of the machine, partially in section, taken on the irregular line 17—17 of Fig. 1; Fig. 18 is a detail perspective view of the front comb or guide P'' of the machine, the cushions P'' being omitted. Fig. 19 is a detail sectional elevation taken on a line corresponding to line 19—19 of Fig. 20, looking toward the rear of the machine, showing the details of the upper combs and their relation to the actuating levers; and Fig. 20 is a detail sectional elevation on line 20—20 of Fig. 19, showing the details of the center support F' and its relation to the upper rear combs, a part of which it supports.

In the drawing, the sectional views are taken looking in the direction of the little arrows at the ends of the section lines, and similar letters of reference refer to similar parts throughout the several views.

Referring to the lettered parts of the drawing, the main frame A of the typewriter is of the usual construction, the upper part being slightly modified to support the non-shifting carriage O which carries the usual platen O'.

This machine is what is known as a "shift-key" machine, the type-bar support itself shifting up and down to enable the use of the double type on each type-bar.

The type-bar support B shifts vertically and is supported on two pairs of links B' which clearly appear in Fig. 1, the said links being pivoted in the rear part of the frame of the machine and extending forwardly and being connected so that when the type-bar support is shifted it has a parallel movement.

The type-bar support is regulated in its longitudinal relations by the adjustable screws a' supported in a suitable bracket A' at each side of the main frame, the detail of the construction clearly appearing in Fig. 6; and the up and down shift is regulated by the set-screws a, a turned into this bracket and adjustable to contact with suitable stops on the type-bar support B which limits its motion. All of these screws are adjusted and retained securely in place by suitable lock-nuts. This type-bar support with its load, consisting of the type-basket and type-bars and their connections, is counter-balanced. One of the lower arms B' has a projecting arm B'' extending rearwardly therefrom which is connected by a link b'' to the lever E which lever is provided with a shift-key at its front end. A rod C extends transversely through the machine, on which rod is a coiled spring C'', the inner end of which is secured to the rod C. A worm gear C' is provided at the outer end, clearly appearing toward the left end of the rod in Fig. 2. Tension is put on this spring C'' by means of a worm b' engaging with the worm wheel C', the worm b' being supported transversely to the worm gear C' in a suitable support carried by the arms B' B'', where, by turning this worm b', with a screw-driver, it winds up the coil spring C'' to any extent desired, so that it will nicely counterbalance the shifting type-bar support and the part which it carries; whereby a very light touch on the shift-key acting through the lever E will shift the type-bar support upwardly. The details of this arrangement for applying tension to the counterbalance spring appear clearly in Fig. 5, the general relation of the parts appearing in Fig. 2; and the general relation of the parts detailed in Fig. 5 appears also in Fig. 1.

The type-bar support consists of double concentric segments in substantially the same plane which are secured together by the rearwardly curved arms b, a side view of which clearly appears in Fig. 3, and the rear view clearly appearing in Fig. 2. There are several of these connecting arms between the outer and inner segments.

A suitable type-basket L is supported by the arms L' extending forwardly from this type-bar support. The basket has a double cushion l for double rows of type, consisting of tubes of leather or other suitable material, filled with sand and located within the same, as clearly appears in Fig. 3.

The front of the machine is inclosed by the cover Q and has an opening Q' corresponding to the front of the type-basket, making the type easily accessible at this point for cleaning and, at the same time, sufficiently covering the type to obscure their action and prevent confusion of the vision of the operator occasioned by the operation of the type in full view. This front is made detachable by screws Q'' Q'', therethrough, suitable slots at the bottom of the front embracing the heads of the screws p p, as clearly appears in Figs. 1 and 17.

The type-bars are supported by my improved hangers which are described in Letters Patent No. 656,785, August 28, 1900, to Fox et al., also in the Clark Patent No. 471,785, March 29, 1892, which hangers lend themselves very effectively to this use.

The folded over parts of the hangers are here faced in opposite directions and are a little out of line with each other, whereby a double row of type bars is supported on each segment of the type bar support.

The shanks are slotted, as clearly appears in Fig. 6, and are retained by suitable tap screws therethrough, suitable kerfs or seats being cut in the segment for the rear row, and suitable washers or clip pieces, such as are shown and described in Patent No. 656,785, August 28, 1900, to Fox et al., and also in the patent to Clark, No. 471,785, March 29, 1892, are provided, to clamp the shanks securely and adjustably in place, each clip embracing two or more shanks.

The hangers M' on the smaller segment of the support are identical in construction with those on the larger support, except that they are made correspondingly smaller and not slotted. I have shown this particular type of hangers because it lends itself especially well to the attachment and arrangement on the segments of the type bar supports, but I desire to remark that other styles of hangers might be substituted by suitably conforming the same.

The type bars on both segments are of slightly different length, as clearly appears in Fig. 4, the shorter ones K of the outer segment and K'' of the inner segment being secured to the hangers in front, and the longer ones K' K''' of each segment being secured to the hangers at the rear.

The bars K' which are secured to the rear, when in their normal position, have a downwardly curved portion close to the hanger of sufficient extent to permit the bar to swing freely to the printing position without contacting with the inner segment of the type-bar support. The bar K on the outside has a similar bend but much less in extent on account of its being located farther forward. The shorter type bars K'' K''' are not necessarily provided with such bends, although I prefer to make them slightly curved. The type bars K''' secured to the back hangers must necessarily be slightly bent, or bent slightly more than the front type bar K'', in order that they may swing to the printing position in the proper relation.

It will be noted that the travel of each type and bar supported on the inner circle and on the outer circle is substantially the same, the types traveling through the same space, the arc which the upper types travel being of lesser radius, but a much greater portion of the circle being traversed.

The type bars are not only bent as I have indicated, to pass each other readily, but, owing to the fact that the double types are used, it will be remarked that those of the center will stand substantially parallel with the type bars; but the other type heads vary in the angle in proportion to the distance of the hangers from the center of the segment, and consequently the heads of the type bars at the extreme right or left approach closely to right angles to the type bars, the intervening ones being in varying positions to correspond thereto. To accommodate these relations satisfactorily, it is necessary or desirable to make bends in the type bars to accommodate these heads and provide for ample clearance, such bends being clearly illustrated in Fig. 4. And where the type bars of the outer segment toward the left or right strike by a type of the inner segment, or vice versa, it is necessary to provide another bend in the type bars supported on the outer segment, which also clearly appears from the developments of the type bars in Fig. 4. The type bars at the extreme right or left of the outer segment are also bent downwardly to swing the type under the front bar of the machine without interference. It will thus be seen that there are two objects in bending these bars:

First.—If they were allowed to stand out straight, the type which are moved around at a greater angle as the bars approach the center of the segment, would strike on the bar just before it. The bending of these bars makes each one shorter in proportion as the bend is greater, otherwise making the type lie nearer the hanger on each succeeding bar as the ends of the segment are approached.

Second.—In connection with the bend at the end of the bar where the type goes in, there is a bend made in the bar near the hanger, which throws the type lower than a line drawn at right angles with the hanger and projecting directly forward. This bend is for the purpose of bringing the type into a lower position where it passes under the front rail, and the front of the carriage lower than would otherwise be the case if the bars did not have this inclination toward the bottom of the basket. The short ends of the levers of these type bars project upwardly, and it is therefore very clear why the two parts of the segments are supported by the curved arms $b$, as this leaves ample space for the accommodation of movement of the short ends of the levers without interference. The double segment and double row of type bar hangers on each segment enables such a distribution of hangers that the maximum length of pivot is possible.

In the basket form of typewriter the hangers are distributed around a full circle, or given a space of 360°. On front strike machines the bars have to be confined to about 125° of an arc, but by putting in the double segment I gain an extra 80°, enabling me to utilize what would be equal to 205° of an arc.

A rod D extends transversely through the lower rear portion of the machine, and on this are supported the levers which actuate the type bar. The rod is supported at its center by the central support F' extending down from the top plate and attached to the cross-bar F. (See Figs. 19 and 20.)

The levers H are comparatively short and are connected by top couplers to the type bars of the outer segment, and the levers H' are comparatively long and are connected by similar top couplings to the short arms of the shorter or inner series of type bars. These levers H H' are all fulcrumed on this rod D by the hubs $h$, but in order to provide a direct connection to the type bars they are extended upwardly and bent so that their upper ends each come into direct line with the particular type bar to which they are to be coupled. It will thus be seen that the ends of these levers H H' are bent into exactly parallel relation with the short levers of the type bars to which they are to be coupled. The longer levers are rearwardly curved opposite the upper portion of the short levers H, so that the play of these different levers does not interfere one with the other, because it is necessary that the shorter levers, in order to effect their proper connection, should lie across the path of the longer levers H', and they would, consequently, interfere therewith but for this provision of offsetting.

The angle at which the different levers operate is clearly illustrated in Fig. 2, the shorter levers H being shown in their relation crossing the longer levers H'. By this means, the connection to the key levers is under perfect control, so that the key levers can be located and arranged in the lower part of the machine exactly as may be desired or required for the most effective printing and arrangement of the key-board. The top couplers between these levers H H' and the type-bars each consist of a rod J' having offset studs or journals j' j' at each end, a strip of spring sheet metal J being clamped around the center of the rod J', with an indentation or offset j'' to prevent turning, and an offset or indentation to engage the rod, and having fingers j extending out into contact with the ends of the journals, whereby this coupling can be snapped into position, the spring parts j j retaining it in place. Owing to the increased motion necessary on the short bars, it is also necessary to connect the coupling wire at a point below the top of hub of the type-bar, and in order to do this the end of the coupler, together with the spring, has to be curved.

Each of the levers H H' is provided with an exactly similar rearwardly projecting short arm H'' which is made substantially straight and projects rearwardly in a substantially horizontal direction.

The upwardly projecting levers H H' are guided by suitable combs consisting of plates T T' T' in which are inserted pins or teeth t. The plates T' are supported from the top of the frame of the machine, and the principal plate T is supported on the central support F'. The objects of these upper combs are that in the event of a quick stroke the pressure on the finger key immediately moves the type, preventing lost motion on account of any lateral movement of the lever, and the guide pins t of the comb take the side strain off from the hubs h which encircle the shaft D.

It is clear that the throw of the different levers and type bars varies somewhat in extent, depending on their position in the circle, whether they are in the front or rear hangers and whether they are in the outer or inner circle of type bars; and this therefore calls for a varying connection to the rearwardly projecting arm H'' of each type bar. I therefore provide an adjustable connection which can be readily set at the right point to effect the proper throw and operation of the type bars. These couplings to the levers H'' appear in their general relation in Fig. 1, and in a somewhat enlarged detail in Fig. 3, and the exact details of the arrangement of the coupler are fully developed and illustrated in Figs. 11 and 12 of the drawing.

The key levers E'' are provided with a folded sheet metal coupling I which wraps around the key lever E'' and embraces an inserted part I' which is conformed to the end H'' of the lever, being contracted at the center to embrace it closely and being opened slightly at each end to permit of the throw of the lever in this support and to permit of the movement of the coupling back and forth on the lever. There is a rolling contact between the arms H'' of the levers H H' and this coupling. The arms H'' rest on the curved seats, and the spaces at each end of the coupling are of such dimension that the levers do not contact to limit their motion. The motion is limited by the movement of the type bars by the type heads either striking the platen or dropping against the cushions of the basket.

The part I is adjustable back and forth on the key lever E'' and is retained in position by the set screw i inserted through a suitable aperture formed through the folds or ears i' of the sheet metal coupling I beneath the lever. By adjusting this coupling back and forth on the key lever E'', the exact throw of the type bar is regulated, and the movement is limited to exactly the amount required to perform its function in the best way.

The rear end of the key lever E'' is regulated to control its connection with the type bar lever by being provided on its upper surfaces with a U-shaped slot preferably contracted at the top, clearly appearing in Fig. 1, which embraces the downwardly projecting flange on the cross-bar e. A comb e'' (see Fig. 13) is retained in this downwardly projecting flange by a clip of metal e''' arranged toward each end of the comb. This comb embraces the end of each lever e'' and prevents its moving out of connection with the downwardly projecting blade.

The height of the key-lever is regulated by the set-screw e' which is turned against the same to regulate its position, the keys being held up against the set screws e' by the usual spring f (Fig. 1), a series of the same being provided, one for each key, and being supported on the cross-bar F. By this arrangement, the position of the key and its relation to the type-bar in its initial position is effectively regulated, and the two structures coöperate perfectly together to that end. Where the height of the key-lever is regulated in this way, it is obviously necessary to provide some effective and satisfactory adjustment or adjustable stops thereon for contacting with the universal bar which controls the escapement. I provide the universal bar N with an oblique upper surface, as clearly appears in Fig. 3. An adjustable slide G is on each key-lever with the under portion inclined to correspond to the inclination of the top surface of the universal bar. This is formed by a sheet of metal folded to conform to the key with the downwardly-projecting inclined portion. The underside of the key-lever E″ is notched by a series of fine notches. A piece G′ is inserted in the bottom fold of the slide G and is notched to correspond to the notching of the key-lever E″. The slide is somewhat larger than the lever and a spring g′ is inserted between the key-lever and the top of the slide, and is curved to hold the slide upwardly with a yielding pressure. This slide is adjusted back and forth on the key lever, and regulates to a nicety the timing of the same in its relation to the operation by the key-levers of the universal spacer-bar. This slide G, conforming to the adjustable inclined top of the bar, is clearly illustrated in Figs. 8, 9 and 10, a reference to which clearly shows completely its formation.

The front portion of the key-levers E″ are guided by my improved guide or comb P′ which is supported on the transverse bar P, which bar supports the lower edge also of the front casing of the machine. This comb is made of a fold of sheet metal, the detail of construction being clearly illustrated in Fig. 18, a cross-section appearing in Fig. 1; and in the bottom of the fold, against which the undersides of the type strike, is a tube P″, preferably of leather, filled with sand, to absorb vibration and prevent noise.

Having thus described the details of my improved typewriter, I desire to remark that I desire to claim the same broadly as well as specifically, and, while I believe the specific means I have used to be of very great advantage, I am aware that they may be considerably modified without departing from the principles of my invention.

Certain parts could be dispensed with without modifying other parts, the corresponding advantage of such parts of course being omitted.

I have provided elaborate means for adjusting the different connections which I desire to claim; but I also desire to remark that the structure could be made without these adjustments and still be a very effective and superior structure. I desire to claim it therefore, with the adjustments, and without the same. I have also shown my type-hanger in this relation, and consider that the same co-acts with the other parts to secure a very valuable result in that a comparatively long pivot can be utilized in a perfect fitting type-hanger which is adjustable; but the other features of the structure would advantageously appear if other styles of type-hangers were made use of. These features are mentioned as mere incidents of what I regard as possible in the way of modifications, and I content myself with this statement. It would be impossible to enumerate the variations which could be accomplished by mechanics skilled in the art to which this invention pertains.

Having thus described my invention, what I claim as new and desire to secure by Letters Patent, is—

1. In a typewriting machine, a typebar support comprising double concentric arcs connected by rearwardly-curved arms, each arc carrying a double rod of typebars; hangers of folded sheet metal for said bars, the inner rows of said hangers being arranged in recesses in said support with the typebar pivots to the rear, the outer row overlapping the same with the typebar pivots to the front: and clip pieces embracing two or more of said hangers, substantially as described.

2. In a typewriting machine, a typebar support comprising double concentric arcs connected by rearwardly-curved arms, each arc carrying a double row of typebars; hangers for said bars, the inner rows of said hangers being arranged in recesses in said support with the typebar pivots to the rear, the outer row overlapping the same with the typebar pivots to the front; and clip pieces embracing two or more of said hangers, substantially as described.

3. In a typewriting machine, the combination of a main supporting frame; a non-shifting carriage with a platen thereon; a shiftable typebar support arranged beneath and toward the front of said platen; typebars on suitable hangers carried by said support; levers H H′ supported on a transverse rod through the rear of the main frame, the levers H′ being the longer and curved rearwardly so as not to interfere with the shorter levers H, said levers being bent laterally into line with the short arms of the typebars; a top coupler connecting the top of each lever with an associated type-bar; rearwardly-projecting arms from each of the said levers H H′; and couplings from said arms to said key-levers for the purpose specified.

4. In a typewriter, the combination of the keys; a front comb or guide made of a folded strip of metal slotted and with a tubular cushion in the bottom fold, as specified.

5. In a front strike typewriter, the combination with typebars and key levers of intermediate levers connected to the typebars, and having rearwardly projecting ends extending in a substantially parallel direction with the key levers; adjustable sheet metal couplings embracing the key levers, and having curved seats formed therein, for the said rearwardly-projecting ends of the intermediate levers, said seats being divergent at each end to permit of the adjustment of the said coupling for varying the said connection, coacting for the purpose specified.

6. In a front strike typewriting machine, the combination of a support for the typebar hangers, having double concentric segments; suitable typebar hangers therein, supporting double head typebars of different lengths, the longer of which typebars are bent to correspond to the double heads of the shorter typebars, whereby they rest side by side in the type-basket and strike past each other and are supported so that, in operation, they travel substantially equal distances in curved paths to the printing point, as specified.

7. In a front strike typewriter, the combination of the typebars in suitable hangers and suitable typebar supports; key levers; intermediate angular levers with couplings for connecting the key levers to the typebars; a transverse rod or shaft for supporting the intermediate levers; a central support extending from the top to the bottom of the machine and embracing the central part of said transverse rod; and an upper comb guide supported on the said central support for embracing and guiding said levers, coacting for the purpose specified.

8. In a front strike typewriter, the combination of the typebars in suitable hangers and suitable typebar supports; key levers; intermediate angular levers with couplings for connecting the key levers to the typebars; a transverse rod or shaft for supporting the intermediate levers; a central support extending from the top to the bottom of the machine and embracing the central part of said transverse rod, coacting for the purpose specified.

9. In a typewriting machine, of the front strike variety, the combination of a shifting typebar support consisting of a plurality of segments, one above the other; typebars with double type heads pivotally supported on the said segments so that those on the upper segment alternate with those of the lower segment, the heads of the typebar of the upper segment being arranged between the said typebars of the lower segment, the typebars of the lower segment being bent to accommodate the heads of the bars of the upper segment; a type basket at the front thereof; and means for shifting the typebar support, coacting as specified.

10. In a front strike typewriting machine, the combination of a typebar support consisting of a type basket semicircular in form, suitable cushions arranged in different planes therein; a typebar support consisting of a double vertically arranged segment, one segment being concentric with the other, with typebars pivotally supported thereon, said typebars lapping upon each other, those of the upper segment having the typeheads arranged between the typebars secured to the lower segment, whereby the said typebars may be operated to swing clear of each other to the platen without obstructing each other from substantially the same elevation, and with substantially the same travel.

In witness whereof, I have hereunto set my hand and seal in the presence of two witnesses.

WILLIAM R. FOX. [L. S.]

Witnesses:
KATHARINE KUNZI,
CAROLINE D. WATERMAN.

Copies of this patent may be obtained for five cents each, by addressing the "Commissioner of Patents, Washington, D. C."